(12) United States Patent
Murata et al.

(10) Patent No.: US 7,003,212 B1
(45) Date of Patent: Feb. 21, 2006

(54) DATA EDITING APPARATUS, DATA EDITING METHOD AND DATA RECORDING/REPRODUCING APPARATUS FOR RE-EDITING FORMERLY EDITED DATA

(75) Inventors: Masakazu Murata, Kanagawa (JP); Ichiro Fujisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1049 days.

(21) Appl. No.: 09/712,991

(22) Filed: Nov. 15, 2000

(30) Foreign Application Priority Data

Nov. 16, 1999 (JP) ................................. 11-326158

(51) Int. Cl.
*H04N 5/76* (2006.01)

(52) U.S. Cl. ............................ 386/52; 386/52; 360/60; 715/723

(58) Field of Classification Search ..................... 386/4, 386/52–64; 360/13; 369/83; 715/723; H04N 5/76, H04N 5/781
See application file for complete search history.

(56) References Cited

U.S. PATENT DOCUMENTS 5,930,446 A * 7/1999 Kanda .......................... 386/52

6,546,188 B1 * 4/2003 Ishii et al. ..................... 386/52
6,658,194 B1 * 12/2003 Omori .......................... 386/52
6,670,966 B1 * 12/2003 Kusanagi ..................... 715/723

FOREIGN PATENT DOCUMENTS

| EP | 0 625 782 | 11/1994 |
|---|---|---|
| EP | 0 801 389 | 10/1997 |
| EP | 0 843 311 | 5/1998 |

* cited by examiner

*Primary Examiner*—Thai Tran
(74) *Attorney, Agent, or Firm*—Frommer Lawrence & Haug LLP; William S. Frommer

(57) ABSTRACT

Provided are a data editing apparatus, a data editing method and a data recording/reproducing apparatus which can easily reedit edited data recorded on a nonlinear-accessible recording medium. When a start point (IN point) or an end point (OUT point) of partial data of edited data to be reedited is specified, a controller controls a recorder and reproducer and HDDs so as to reproduce material data containing the partial data to be reedited in synchronization with operation for changing the specified start or end point of the partial data. Moreover, when operation for determining a new start or end point is performed in a state in which the material data is reproduced in synchronization with changing operation, the controller reedits the edited data in accordance with determining operation. During reediting, the controller reedits data on the basis of a temporary file. The controller reedits data while reproducing the same reproducing state as the reproducing state after reediting.

13 Claims, 11 Drawing Sheets

FIG.5A FE
| File name |
| Pointer to first record entry |
| File number |

FIG.5B RE
| Pointer to next record entry |
| Head address |
| Data length of continuous area |

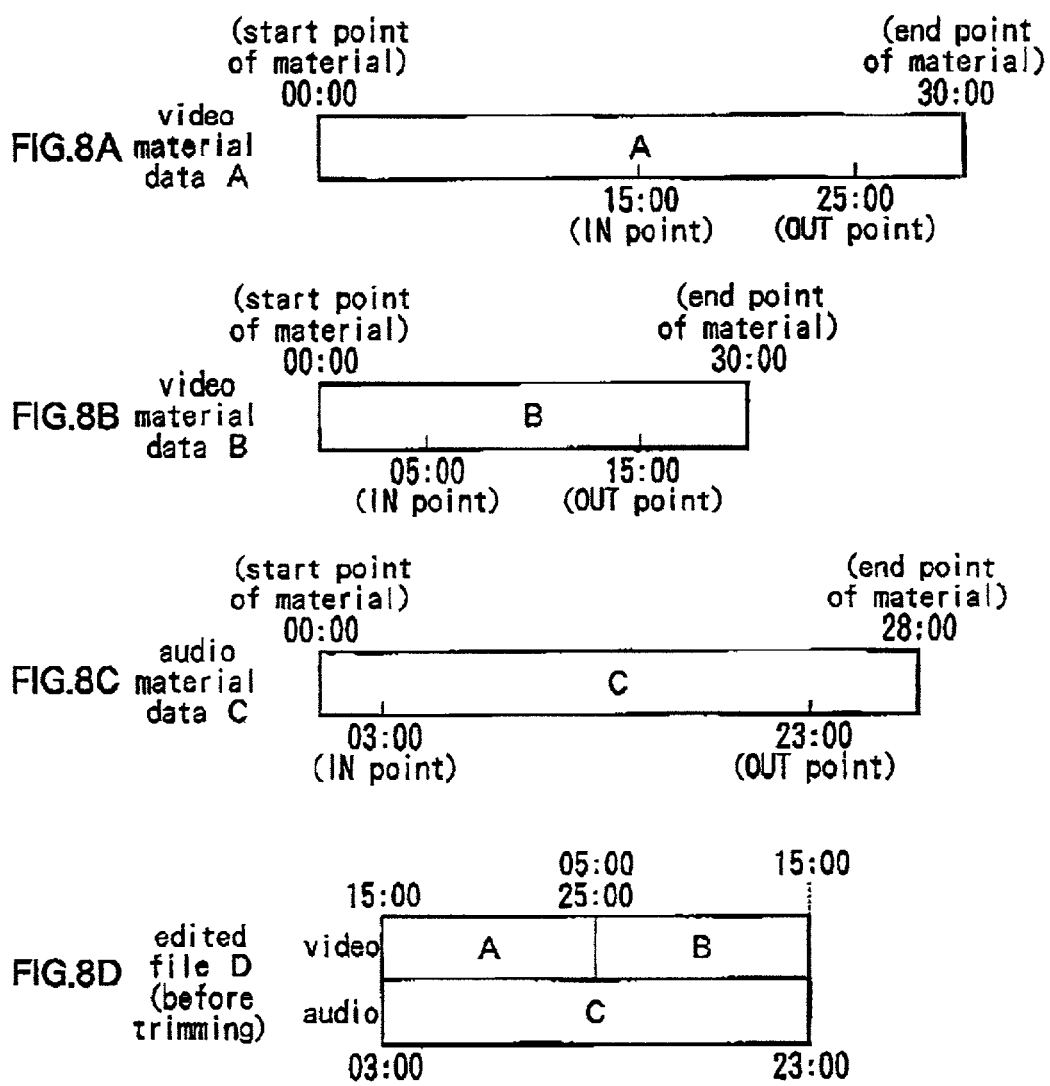

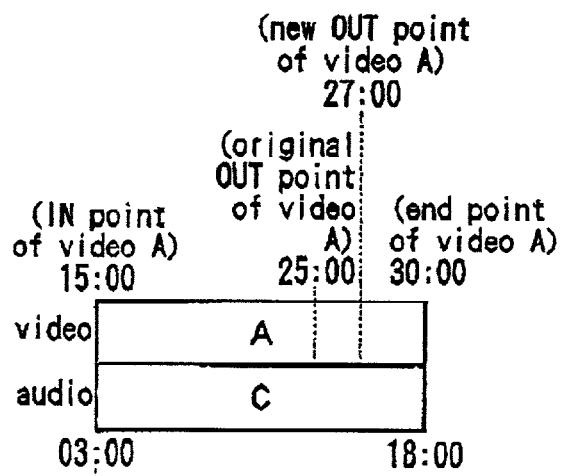
FIG.9A temporary file D1
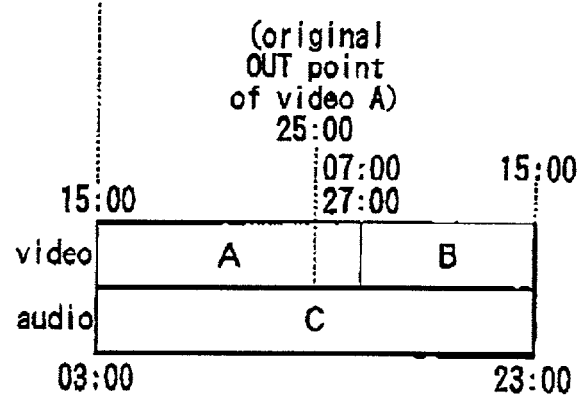
FIG.9B reedited file D2 in overwrite mode
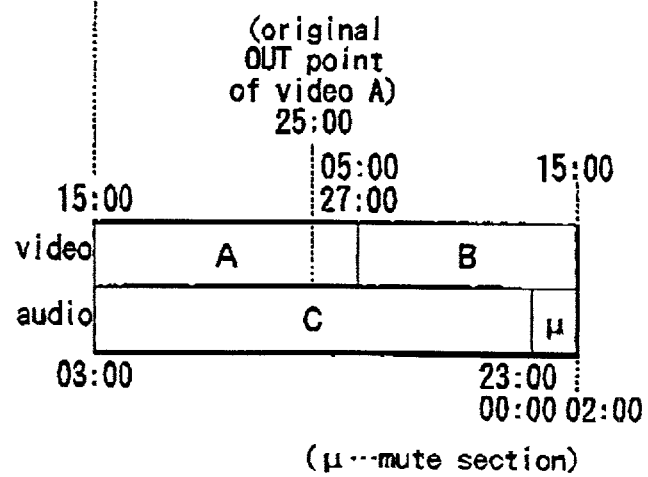
FIG.9C reedited file D3 in insert mode
(μ···mute section)

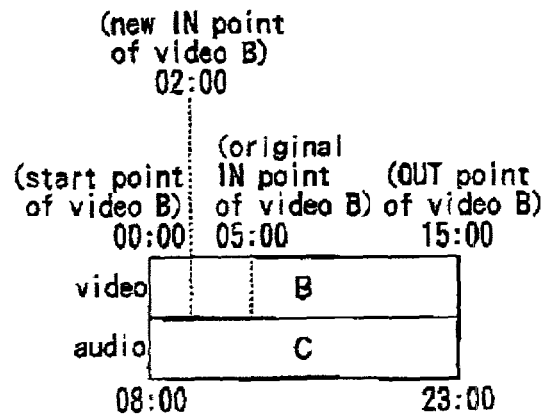
FIG.10A temporary file D11
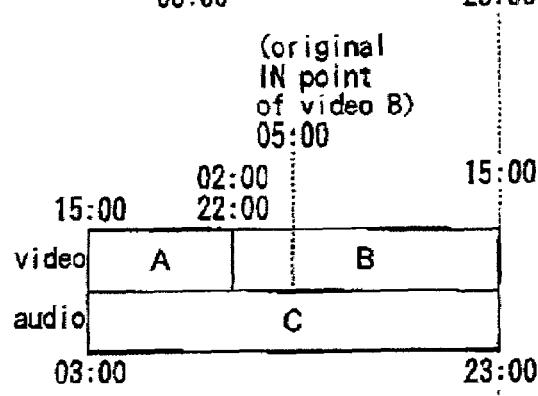
FIG.10B reedited file D12 in overwrite mode
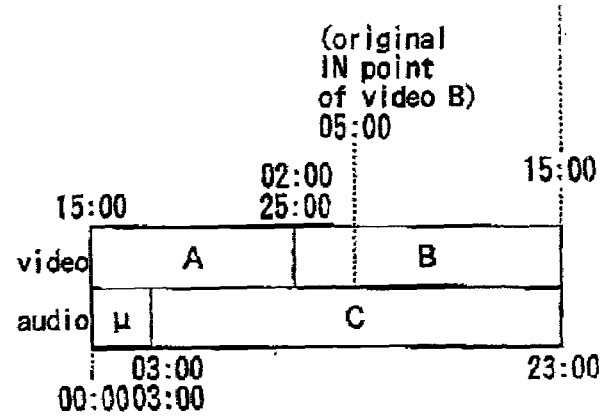
FIG.10C reedited file D13 in insert mode
(μ···mute section)

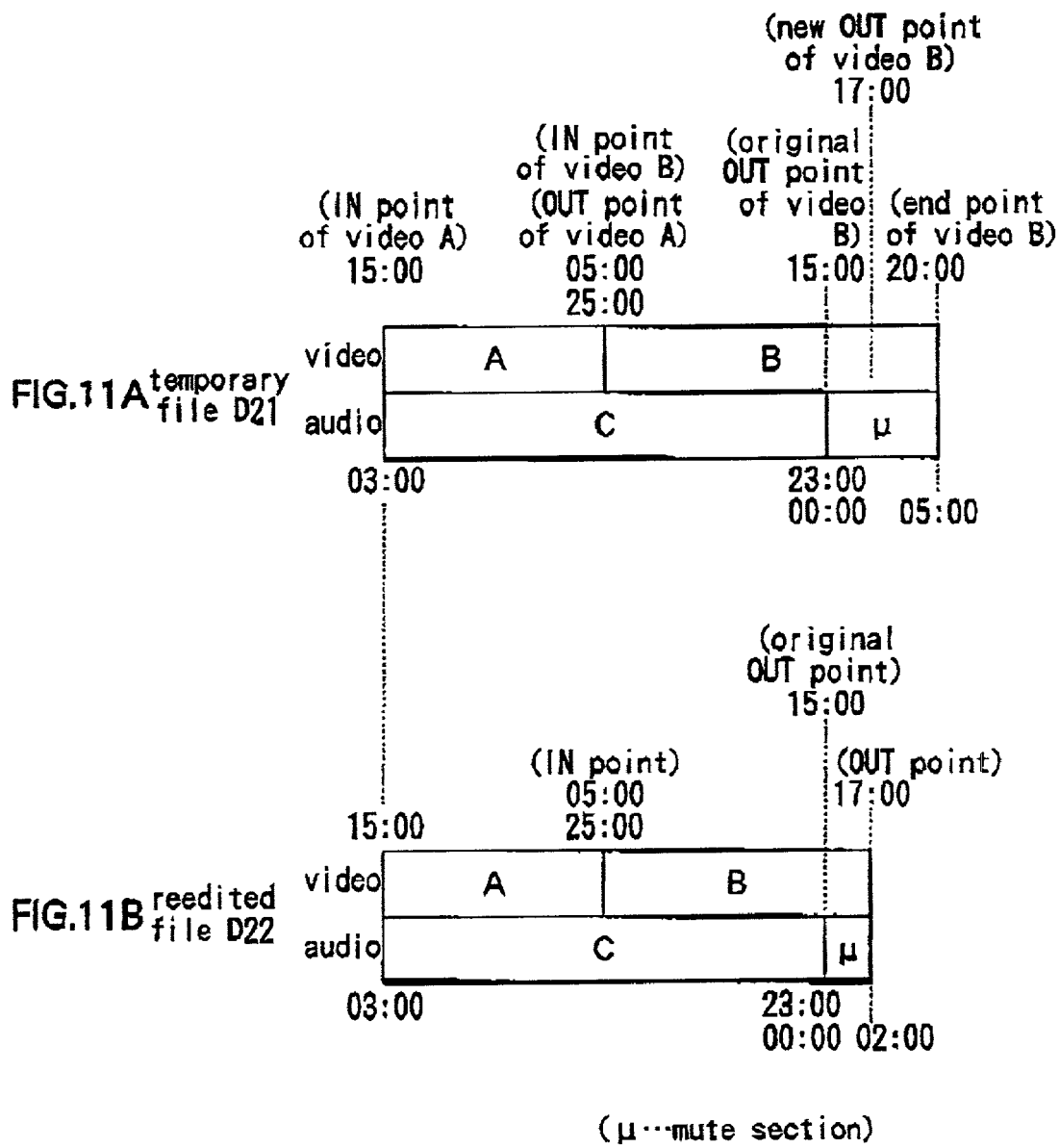
FIG.11A temporary file D21
FIG.11B reedited file D22
(μ···mute section)

DATA EDITING APPARATUS, DATA EDITING METHOD AND DATA RECORDING/REPRODUCING APPARATUS FOR RE-EDITING FORMERLY EDITED DATA

BACKGROUND OF THE INVENTION

1. Field of the Invention

The invention relates to a data editing apparatus, a data editing method and a data recording/reproducing apparatus which are capable of reediting audio and/or video (hereinafter referred to as AV) data or the like recorded on a nonlinear-accessible recording medium.

2. Description of the Related Art

In recent years, in accordance with multi-channeling for providing information due to the spread of a CATV (cable television) or the like, there has been a growing demand to simultaneously reproduce a plurality of data with one data recording/reproducing apparatus, as distinct from a conventional VCR (Video Cassette Recorder). In response to this demand, an apparatus called an AV server for recording/reproducing a plurality of audio and/or video data by using a random-accessible recording medium such as a semiconductor memory, a magneto-optical disk and a hard disk is coming into a widespread use.

FIG. 1 is an illustration of an example of a configuration of a conventional AV server. The AV server shown in FIG. 1 comprises a main unit 921 containing a random-accessible recording medium such as a hard disk, and a terminal unit 922 such as a personal computer connected to the main unit 921. The main unit 921 is equipped with a power switch 923, and a simple indicator 924 formed of an LED (a Light Emitting Diode) or the like for indicating a simple operating status of the main unit 921. The terminal unit 922 has a display capable of displaying various types of information, and a pointing device such as a keyboard or a mouse.

In the AV server having the above-mentioned configuration, the main unit 921 does not have an operation switch or the like for editing data. Thus, the terminal unit 922 gives instructions to input or output data or perform operation for editing data. A user operates the terminal unit 922 by using the mouse or the like on a screen based on an application such as a so-called GUI (Graphical User Interface) provided in order to operate the main unit 921, thereby instructing the main unit 921 to input or output data or to perform other operations.

The AV server generally has a plurality of input and output ports by making use of merits of the random-accessible recording medium, as distinct from conventional VCR equipment. Often, the above-mentioned AV server records a large amount of AV data in a large-capacity recording medium such as the hard disk and manages the AV data by treating a predetermined unit of data (e.g., data on a material-by-material basis) as a batch unit of management (hereinafter referred to as "a file"), as distinct from the VCR for managing materials videotape by videotape. In other words, the AV server generally records a plurality of AV data file by file in the recording medium. In case of editing data to create a new file by combining a plurality of partial data extracted from a plurality of files, the AV server does not have to actually process data but edits, for example, only location information in the recording medium and stores the edited location information, thereby being able to define a data structure of a new file.

As mentioned above, the conventional AV server performs operation for editing data in a GUI environmental provided by the terminal unit 922. However, a lot of editing equipment of a specific keyboard type capable of touch typing is used in a linear editing system using the VCR. Thus, it is not possible that users widely accept an operating environment of the AV server for performing operation in the GUI environment. More particularly, users who have used the conventional VCR feel inconvenience of operation in the GUI environment.

A stand-alone type AV server, which is capable of stand-alone operation and is used in much the same way the VCR is used, has been developed in recent years. The development of the stand-alone type AV server enables conventional editing equipment for linear editing to be connected to the AV server.

However, the simple introduction of the conventional editing equipment for linear editing into the stand-alone type AV server does not bring out merits of the AV server using a nonlinear-accessible recording medium. To edit data such as partly overwrite data of a file A with data in a specified section of a file B and insert the data of the file B into the data of the file A, the VCR overwrites the data in the specified section of the file B directly onto a videotape recording the data of the file A and thus requires real-time recording operation. On the other hand, the AV server does not have to actually process data itself but can store only information such as a data insert location or the order in which data of each file are to be reproduced, in accordance with the content of editing. Therefore, the AV server does not perform actual recording operation, as distinct from the VCR.

For the above-mentioned editing, the VCR actually overwrites the data of the file A with the data of the file B. Thus, an overwritten data portion of the file A disappears from the tape. After editing data through overwriting of data, the VCR cannot therefore restore the overwritten data portion of the file A when subjecting the edited data to so-called trimming for making fine adjustments of start and end points of a section in which the data of the file B is inserted. On the other hand, for the above-mentioned editing, the AV server does not actually process data itself but merely defines the order in which the data of each file are to be reproduced or the like. Thus, the data of the files A and B actually exist as they were before editing. Even when subjecting the edited data to trimming for making fine adjustments of the start and end points of the section in which the data of the file B is inserted, the AV server can therefore reproduce, without any problems, the data section of the file A which the VCR would erase through overwriting, by redefining the order in which the data are to be reproduced or the like.

The VCR can overwrite the data of the file A with the data of the file B with relative ease. However, the VCR needs to again rerecord the data of both of the files A and B in case of editing such as inserting the data of the file B into any given location in the data of the file A without overwriting. On the other hand, the AV server does not actually process data itself for the above-mentioned editing. Thus, the AV server does not need to again record the data even for editing of inserting the data.

As described above, the AV server using the nonlinear-accessible recording medium has merits which the VCR does not have. When the AV server adapts the conventional linear editing equipment without any modification, the AV server is preferred by users because of operability, but the AV server is unable to make full use of the above-mentioned merits characteristic of the AV server. On the other hand, the operating environment based on the GUI environment can make use of the merits of the AV server, as compared to the use of the editing equipment for linear editing. However, the GUI environment has a problem that users who have used the conventional VCR are not satisfied with the GUI environment because of less ease of operation.

SUMMARY OF THE INVENTION

The invention is designed to overcome the foregoing problems. It is an object of the invention to provide a data editing apparatus, a data editing method and a data recording/reproducing apparatus which can easily reedit edited data recorded on a nonlinear-accessible recording medium.

A data editing apparatus of the invention for reediting edited data composed of combination of a plurality of partial data extracted from at least one material data, which is used in combination with a data recording/reproducing apparatus capable of recording/reproducing the material data and edited data by using a nonlinear-accessible recording medium, comprises: controlling means for controlling the data recording/reproducing apparatus so as to reproduce material data containing at least partial data to be reedited in synchronization with an operation for changing a specified start or end point of the partial data, when the start point or the end point of the partial data of the edited data to be reedited is specified; and editing means for reediting the edited data in accordance with a determining operation, for determining a new start or end point, the determining operation being performed while the material data is being reproduced in synchronization with operation for changing.

A data editing method of the invention for reediting edited data composed of a combination of a plurality of partial data extracted from at least one material data, which is used in combination with a data recording/reproducing apparatus capable of recording/reproducing the material data and edited data by using a nonlinear-accessible recording medium, comprises the steps of controlling the data recording/reproducing apparatus so as to reproduce material data containing at least partial data to be reedited in synchronization with an operation for changing a specified start or end point of the partial data, when the start point or the end point of the partial data of the edited data to be reedited is specified; and reediting the edited data in accordance with a determining operation, for determining a new start or end point, the determining operation being performed while the material data is being reproduced in synchronization with operation for changing.

A data recording/reproducing apparatus of the invention capable of reediting edited data composed of a combination of a plurality of partial data extracted from at least one material data, comprises: recording/reproducing means for recording/reproducing the material data and the edited data by using a nonlinear-accessible recording medium; controlling means for controlling the AV server means so as to reproduce material data containing at least partial data to be reedited in synchronization with an operation for changing a specified start or end point of the partial data, when the start point or the end point of the partial data of the edited data to be reedited is specified; and editing means for reediting the edited data in accordance with a determining operation, for determining a new start or end point, the determining operation being performed while the material data is being reproduced in synchronization with operation for changing.

In the data editing apparatus, the data editing method and the data recording/reproducing apparatus of the invention, when the start point or the end point of the partial data of the edited data to be reedited is specified, the material data containing at least the partial data to be reedited is reproduced in synchronization with the operation for changing the specified start or end point of the partial data. Moreover, when the operation for determining a new start or end point is performed in a state in which the material data is reproduced in synchronization with the changing operation, the edited data is reedited in accordance with the determining operation.

Other and further objects, features and advantages of the invention will appear more fully from the following description.

BRIEF DESCRIPTION OF THE DRAWINGS

FIGS. 5A and 5B are illustrations of file management information managed by an information manager shown in FIG. 2;

FIGS. 8A and 8D are illustrations of reediting of data by means of trim facilities;

FIGS. 9A to 9C are illustrations of a specific example of reediting of data by means of the trim facilities using the external control panel;

FIGS. 10A to 10C are illustrations of another specific example of reediting of data by means of the trim facilities using the external control panel;

FIGS. 11A and 11B are illustrations of still another specific example of reediting of data by means of the trim facilities using the external control panel.

DETAILED DESCRIPTION OF THE PREFERRED EMBODIMENTS

An embodiment of the invention will be described in detail below with reference to the accompanying drawings.

Figure 3:
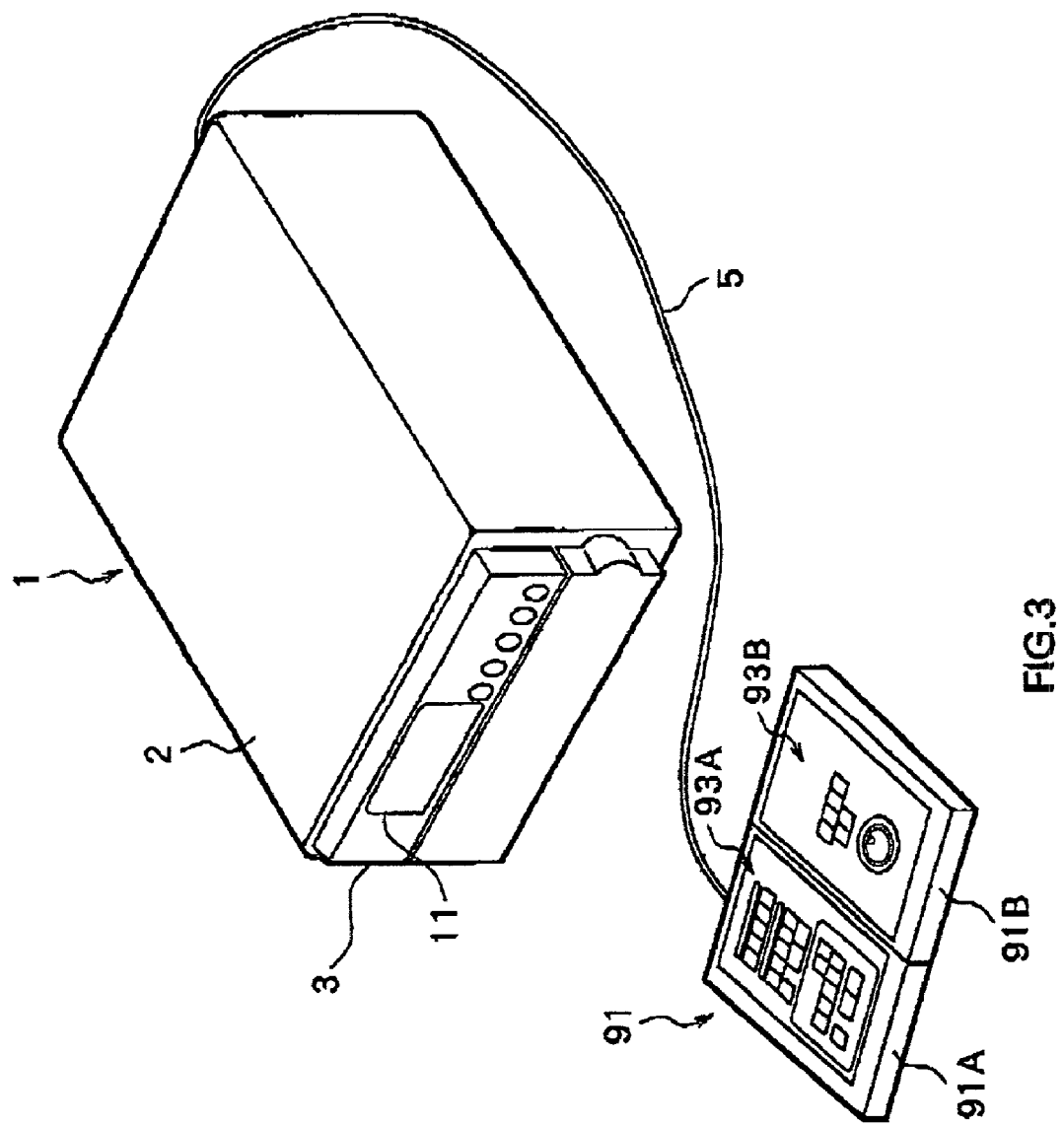
FIG. 3 is a perspective view showing an external appearance of the data recording/reproducing apparatus according to one embodiment of the invention.

FIG. 3 is a perspective view of an external appearance of a data recording/reproducing apparatus according to one embodiment of the invention. The data recording/reproducing apparatus according to the embodiment comprises a main unit 1 having one housing 2, and an external control panel 91 connected to the main unit 1 through a connect cable 5. The main unit 1 is approximately the same size as one VCR, for example. A meter panel 3 is provided on an upper area of a front surface of the main unit 1.

The data recording/reproducing apparatus according to the embodiment comprises four ports 60A to 60D (see FIG. 2) functioning as input ports for inputting AV data or output ports for outputting AV data, as described later. The ports can input or output data independently of one another. Each port can input or output video data and four-channel or eight-channel audio data, for example. The meter panel 3 comprises an indicator 11 for indicating an operating status of each port, or the like.

The external control panel 91 has facilities for giving each port of the main unit 1 instructions to select AV data to be inputted and outputted, instructions to edit or reedit AV data, or the like. The external control panel 91 is provided separately from the main unit 1. The external control panel 91 is shaped into a rectangular parallelepiped similar to a specific keyboard for conventional VCR editing, for instance. The external control panel 91 has a main panel 91A connected to the connect cable 5, and a subpanel 91B to be optionally attached to the main panel 91A. The main panel 91A is mainly used for operation for inputting and outputting data file by file. An operation console 93A having a plurality of operation switches for use in operation for inputting and outputting data or the like is provided on an upper surface of the main panel 91A. Moreover, the main panel 91A has facilities for controlling the subpanel 91B. On the other hand, the subpanel 91B is mainly used to edit data. The subpanel 91B is electrically, mechanically attached to the main panel 91A. An operation console 93B having a plurality of operation switches for use in editing of data or the like is provided on an upper surface of the subpanel 91B. The external control panel 91 corresponds to a specific example of "a console" of the invention.

The external control panel 91 can have a configuration using only the main panel 91A without the use of the subpanel 91B. When the subpanel 91B is not used in the data recording/reproducing apparatus according to the embodiment, a part of editing facilities of the subpanel 91B can be replaced by, for example, editing equipment for linear editing for use in conventional VCR editing which is separately attached to the main unit 1. However, nonlinear editing facilities of the subpanel 91B cannot be used when the subpanel 91B is replaced with the editing equipment for linear editing.

Figure 4:
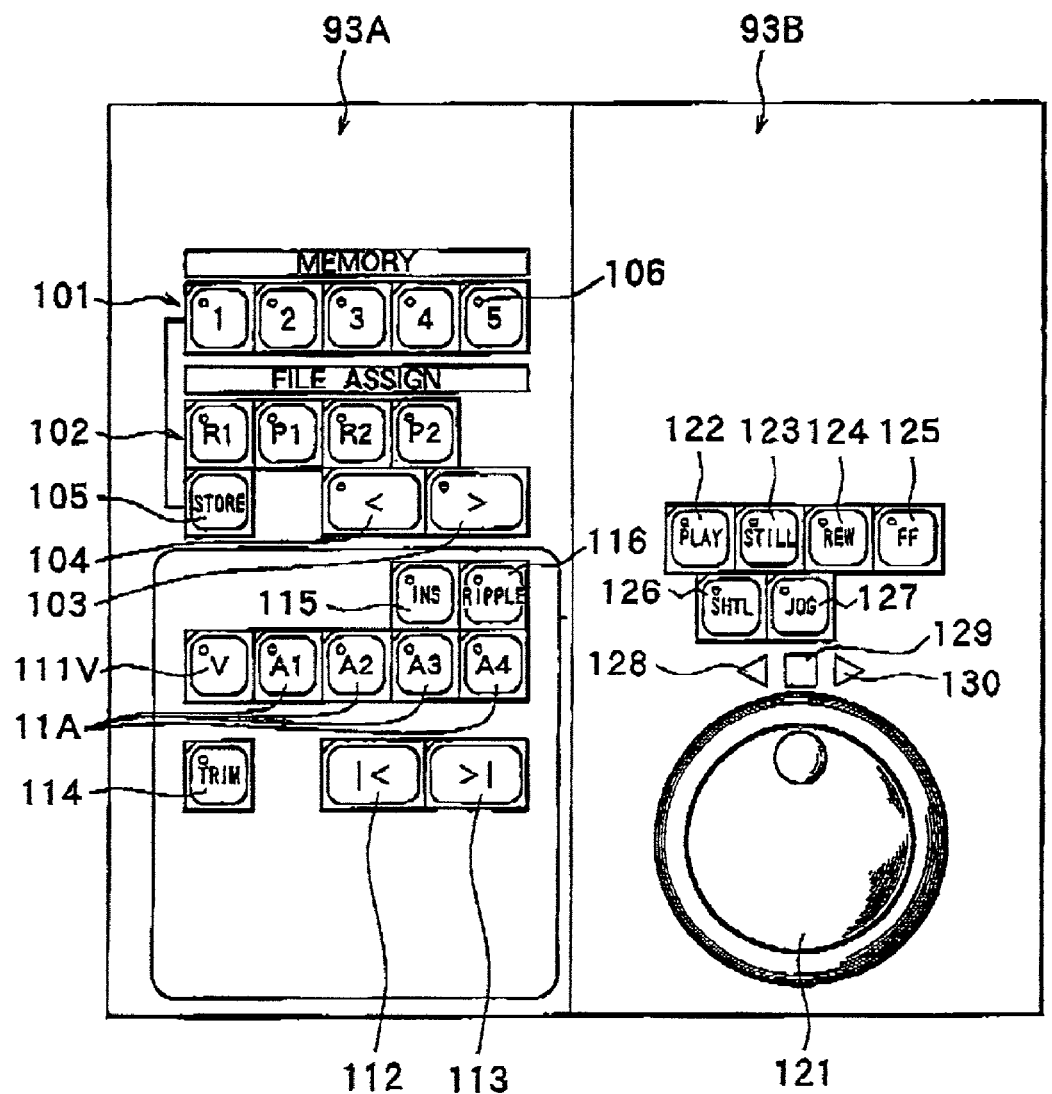
FIG. 4 is a front view of a main part of operation consoles of an external control panel shown in FIG. 3.

FIG. 4 is a front view of a main part of the operation consoles 93A and 93B of the external control panel 91 shown in FIG. 8.

As shown in FIG. 4, the operation console 98A of the main panel 91A has memory keys 101, each of which is to be linked to any given file number, port select keys 102 for selecting a port to be operated, an up key 103 and a down key 104 for specifying the file number of a file to be inputted and outputted or to be subjected to other operations, and a store key 105 to be manipulated to link each of the memory keys 101 to any given file number. The up key 103 is used to specify the file number in order of increasing number. The down key 104 is used to specify the file number in order of decreasing number.

The operation console 93A of the main panel 91A further has a video channel specifying key 111V to be manipulated to use data of a video channel, audio channel specifying keys 111A to be manipulated to use data of an audio channel, a go-head key 112 to be manipulated to specify an IN point (a start point) of data for editing of data or the like, a go-tail key 113 to be manipulated to specify an OUT point (an end point) of data for editing of data or the like, a trim key 114 to be manipulated to reedit data using trim facilities, an insert (INS) mode key 115 to be manipulated to use the trim facilities in insert mode, and a ripple mode key 116 to be manipulated to use the trim facilities in ripple mode. These manipulating keys (application-specific keys) provided on the operation console 93A of the main panel 91A are pushbutton type keys that are manipulated by being pressed, for example.

The operation console 93B of the subpanel 91B has a jog dial 121 to be manipulated to reproduce data at variable speed, a play key 122 to be manipulated to reproduce data, a still key 123 to be manipulated to cause, for example, data reproducing operation to pause, a fast-forward (FF) key 124 to be manipulated to reproduce data at high speed in the forward direction, a rewind (REW) key 125 to be manipulated to reproduce data at high speed in the reverse direction, a shuttle (SHTL) key 126 and a jog key 127 to be used together with the jog dial 121 to reproduce data at variable speed. These manipulating keys (application-specific keys) provided on the operation console 93B of the subpanel 91B are pushbutton type keys that are manipulated by being pressed, for example.

The operation console 93B of the subpanel 91B further has status indicators 128 to 130 for indicating the operating status by means of a light emitting device such as an LED. The status indicator 128 is illuminated when data is reproduced in the reverse direction. The status indicator 130 is illuminated when data is reproduced in the forward direction. The status indicator 129 is illuminated when data reproducing is stopped.

The jog dial 121 can be turned clockwise and counterclockwise. Variable-speed reproducing operation using the jog dial 121 has two modes. Each mode can be selected by the shuttle key 126 or the jog key 127.

In the mode selected by the jog key 127, data is reproduced at "consecutive" variable speeds according to an angle of turn of the jog dial 121. In the mode selected by the shuttle key 126, the jog dial 121 has a plurality of set angles, and a predetermined reproducing speed is linked to each of the set angles. In the mode, when the jog dial 121 turns by the set angle, data is reproduced at variable speed in accordance with the speed linked to the set angle. For example, four angles, i.e., angles of 30° and 60° in the clockwise direction and angles of 30° and 60° in the counterclockwise direction are set as the set angles in the mode selected by the shuttle key 126. In the mode selected by the shuttle key 126, for example, the reproducing speed for reproducing data at one-time speed in the forward direction is linked to an angle of 30° in the clockwise direction, and the reproducing speed for reproducing data at double speed in the forward direction is linked to an angle of 60° in the clockwise direction. In the mode, for example, the reproducing speed for reproducing data at one-time speed in the reverse direction is linked to an angle of 30° in the counterclockwise direction, and the reproducing speed for reproducing data at double speed in the reverse direction is linked to an angle of 60° in the counterclockwise direction.

An indicator 106 for indicating a manipulating status of each manipulating key is provided on the surface of each of main manipulating keys on the operation console 93A of the main panel 91A and the operation console 93B of the subpanel 91B. Light emitting means such as an LED is provided in each manipulating key having the indicator 106. Each indicator 106 indicates the status by controlling light emission of the light emitting means such as the LED in accordance with the manipulating status of each manipulating key.

Mainly, the go-head key 112 and the go-tail key 113 on the main panel 91A correspond to a specific example of "a specifying switch" of the invention. The operation console 93B of the subpanel 91B corresponds to a specific example of "a changing operation console" of the invention. The insert mode key 115 and the ripple mode key 116 on the main panel 91A correspond to a specific example of "an edit mode select switch" of the invention. A specific example of editing operation by means of the trim facilities using the external control panel 91 will be described in detail later with reference to the drawings.

Figure 1:
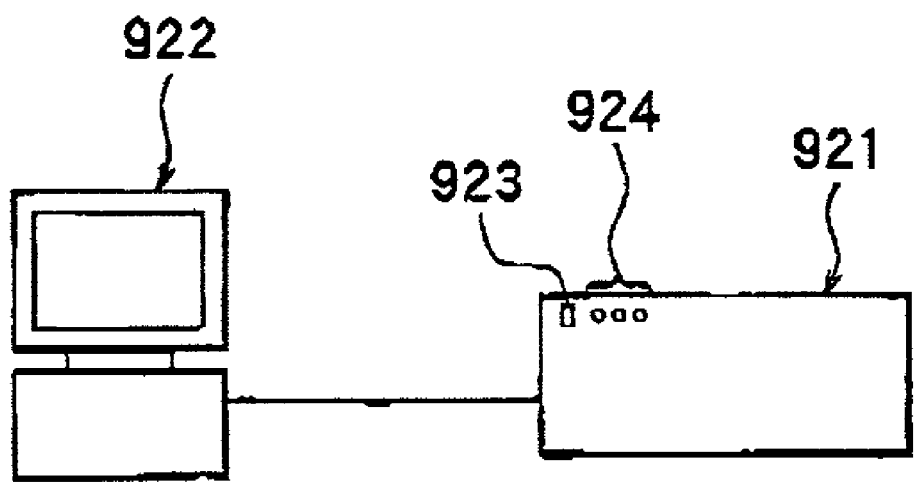
FIG. 1 is an illustration showing an example of a configuration of a conventional AV server.
Figure 2:
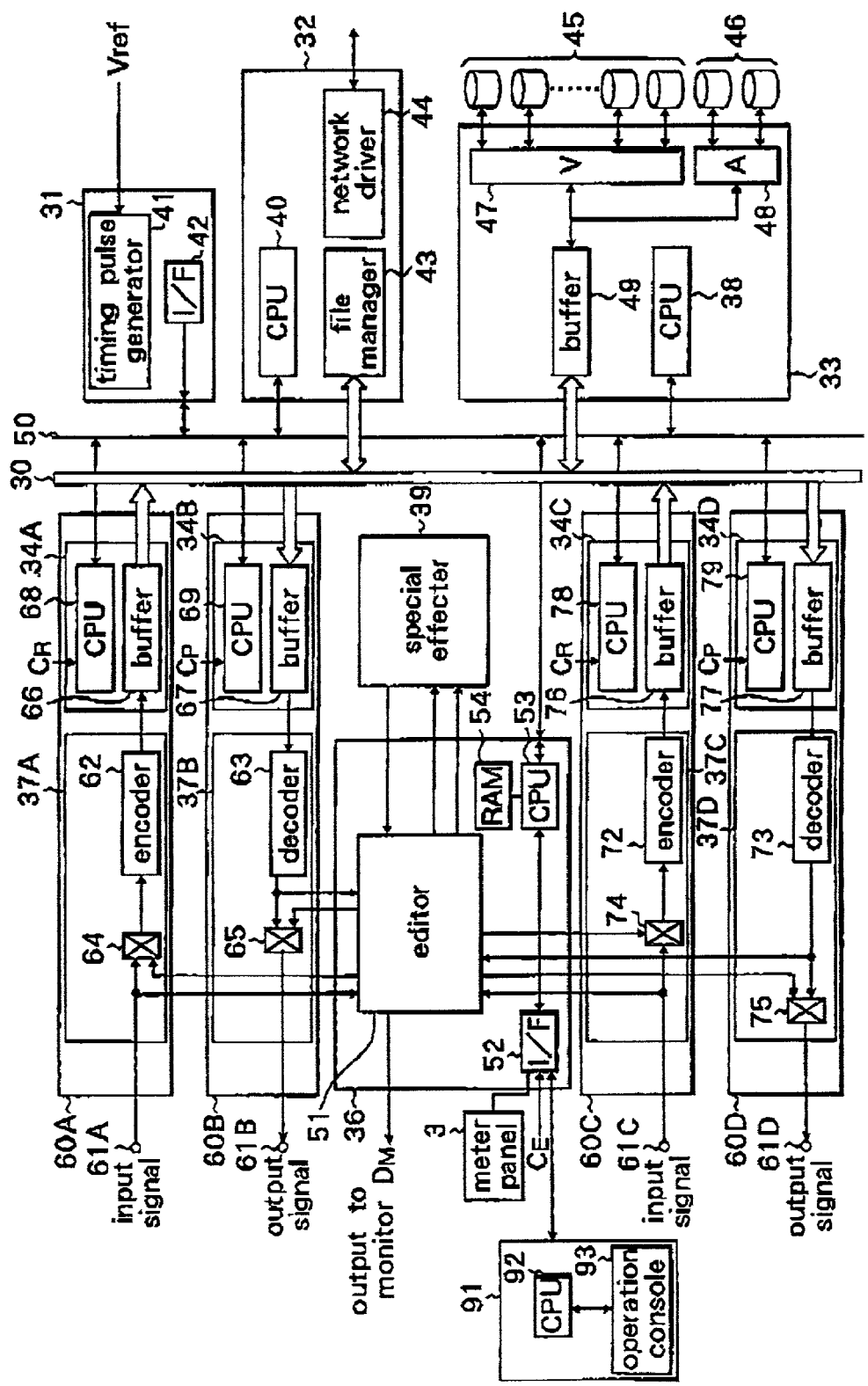
FIG. 2 is a block diagram of a circuit configuration of a data recording/reproducing apparatus according to one embodiment of the invention.

FIG. 2 is a block diagram of a circuit configuration of the data recording/reproducing apparatus according to the embodiment. The data recording/reproducing apparatus according to the embodiment comprises two internal buses, i.e., a data bus 30 for mainly transferring AV data, and a control bus 50 for mainly transferring control commands in the apparatus. An information manager 32, a recorder and reproducer 33 and data managers 34A to 34D are connected to the data bus 30. On the other hand, a timing manager 31, the information manager 32, the recorder and reproducer 33, the data managers 34A to 34D and a controller 36 are connected to the control bus 50. Data input and output ports 37A to 37D are connected to the data managers 34A to 34D, respectively. A special effecter 39 is connected to the controller 36. The meter panel 3 and the external control panel 91 are connected to the controller 36. The components 31 to 39 are provided on separate substrates, for example.

The external control panel 91 has a CPU (Central Processing Unit) 92 for controlling the operation console 93. The CPU 92 is provided in the main panel 91A (see FIG. 3) of the external control panel 91. The CPU 92 is electrically connected to the subpanel 91B (see FIG. 3) and is connected to the controller 36 of the main unit 1 through the connect cable 5. The CPU 92 monitors a status of entry by means of the manipulating keys or the like of the operation console 93, transmits control commands to the controller 36 in accordance with the entry status, and receives a status signal transmitted from the controller 36 of the main unit 1 in response to the control commands. The CPU 92 controls the light emitting means of the indicator 106 provided on each of the main manipulating keys of the operation console 93. Control commands to be transmitted from the CPU 92 include, for example, commands to link each of the memory keys 101 on the main panel 91A to any given specified file number.

The timing manager 31 has a timing pulse generator 41. The timing manager 31 further has a microcomputer (not shown) including a CPU, a ROM (Read Only Memory) and a RAM (Random Access Memory). The timing pulse generator 41 generates a timing pulse and supplies the timing pulse to each and every circuit needing the timing pulse, such as the data managers 34A to 34D and the controller 36. A reference video signal $V_{ref}$ from an external apparatus is inputted to the timing pulse generator 41. The timing manager 31 further has an interface 42 (I/F in the drawings) for connecting external control equipment with the control bus 50.

The information manager 32 has a CPU 40 connected to the control bus 50, for performing main control over the information manager 32; a file manager 43 for holding file management information on a file recording area in a recording medium and managing a file on the basis of the file management information; and a network driver 44 connected to an external network such as Ethernet, for inputting and outputting data in/from the external network. The file management information managed by the information manager 32 will be described in detail later with reference to the drawings.

The recorder and reproducer 88 has a CPU 88 connected to the control bus 50, for performing main control over the recorder and reproducer 33; a video disk array controller 47 connected to a plurality of hard disk drives 45 (hereinafter referred to as HDDs) for recording video data, for controlling the HDDs 45; an audio disk array controller 48 connected to a plurality of HDDs 46 for recording audio data, for controlling the HDDs 46; and a buffer memory 49 for temporarily storing data provided between the disk array controllers 47 and 48 and the data bus 30. The number of HDDs 45 for video data is nine. Eight HDDs 45 of the nine HDDs 45 are used for recording AV data, and one HDD 45 is used for recording parity data. The nine HDDs 45 and the video disk array controller 47 constitute a system of RAID (Redundant Arrays of Inexpensive Disks)-3. On the other hand, the number of HDDs 46 for audio data is two. The two HDDs 46 and the audio disk array controller 48 constitute a system of RAID-1.

The controller 36 has an editor 51; an interface 52 (I/F in the drawings) to which various types of equipment are to be connected; a CPU 53 connected to the control bus 50, for performing main control over the controller 36; and a RAM 54 connected to the CPU 53, for storing various types of information. The interface 52 connects the meter panel 3 and the CPU 92 of the external control panel 91 to the CPU 53. An edit command $C_E$ from an external apparatus can be also inputted to the interface 52. The editor 51 has the functions of a matrix switcher (router) and an audio mixer. The editor 51 is connected to the special effecter 39. The editor 51 has two data output paths for outputting data to the special effecter 39, and one data input path for inputting data from the special effecter 39 to the editor 51. Moreover, the editor 51 can output data $D_M$ for monitoring.

In the controller 36, the CPU 53 receives control commands from the CPU 92 of the external control panel 91 or the like through the interface 52, analyzes the contents of the received commands, and controls circuits in or out of the controller 36 and other circuits so as to perform operation based on the contents of the commands. For example, when the CPU 53 receives commands about file management, the CPU 53 controls mainly the information manager 32. When the CPU 53 receives commands about control over the router of the editor 51 in the controller 36, the CPU 53 controls the editor 51. For example, when the CPU 53 receives the commands to link each of the memory keys 101 on the main panel 91A to any given specified file number from the external control panel 91, the CPU 53 links each of the memory keys 101 to a specified file number and causes the RAM 54 to store link information. Main control of the CPU 53 over other circuits is performed by transmitting and receiving control commands to/from CPUs of other circuits through the control bus 50. When the CPU 53 receives the control commands from the CPU 92 of the external control panel 91, the CPU 53 transmits a status signal indicating the control result to the CPU 92. The status signal transmitted from the CPU 53 is monitored by the CPU 92 of the external control panel 91 and is used to grasp the operating status of the main unit 1.

In the controller 36, the CPU 53 makes access to the information manager 32 at predetermined intervals and causes the RAM 54 to store the file management information managed by the information manager 32. An area for storing the file management information is ensured in the RAM 54. The file management information managed by the information manager 32 contains address information on an address of a location at which data is recorded on the HDDs 45 and 46, as described later. A time code value, i.e., a time code into which the address information on the HDDs 45 and 46 is converted, is stored as the file management information in the RAM 54 of the controller 36. For example, to link each of the memory keys 101 on the main panel 91A to a file number as mentioned above, the CPU 53 refers to the file management information stored in the RAM 54.

The special effecter 39 has a microcomputer (not shown) including a CPU, a ROM and a RAM and performs processing for obtaining special effects such as dissolves or wipes.

Each of the data input and output ports 37A to 37D has a microcomputer (not shown) including a CPU, a ROM and a RAM. The data input and output ports 37A to 37D are connected to terminals 61A to 61D, respectively. It is herein assumed that the terminals 61A and 61C are data input terminals and that the terminals 61B and 61D are data output terminals. AV data to be inputted and outputted by the terminals 61A to 61D is digital data based on serial digital interface (hereinafter referred to as SDI) standards, for example.

The data input and output port 37A and the data manager 34A constitute one port 60A. The data input and output port 37B and the data manager 34B constitute one port 60B. The data input and output port 37C and the data manager 84C constitute one port 60C. The data input and output port 37D and the data manager 34D constitute one port 60D.

The data input and output port 37A has an encoder 62 for extracting AV data from data based on the SDI standards and compressing the AV data as necessary, and a switch 64 having two inputs and one output. One input terminal of the switch 64 is connected to the terminal 61A, the other input terminal thereof is connected to the editor 51, and the output terminal thereof is connected to the input terminal of the encoder 62. The terminal 61A is also connected to the editor 51.

The data input and output port 37B has a decoder 63 for expanding data if the data is compressed and converting the data into data based on the SDI standards, and a switch 65 having two inputs and one output. One input terminal of the switch 65 is connected to the output terminal of the decoder 63, the other input terminal thereof is connected to the editor 51, and the output terminal thereof is connected to the terminal 61B. The output terminal of the decoder 63 is also connected to the editor 51.

The data input and output port 37C has an encoder 72 for extracting AV data from data based on the SDI standards and compressing the AV data as necessary, and a switch 74 having two inputs and one output. One input terminal of the switch 74 is connected to the terminal 61C, the other input terminal thereof is connected to the editor 51, and the output terminal thereof is connected to the input terminal of the encoder 72. The terminal 61C is also connected to the editor 51.

The data input and output port 37D has a decoder 73 for expanding and converting the compressed data into the SDI standards, and a switch 75 having two inputs and one output. One input terminal of the switch 75 is connected to the output terminal of the decoder 73, the other input terminal thereof is connected to the editor 51, and the output terminal thereof is connected to the terminal 61D. The output terminal of the decoder 73 is also connected to the editor 51.

The data manager 34A has a buffer memory 66 interposed between the output terminal of the encoder 62 of the data input and output port 37A and the data bus 30. The data manager 34B has a buffer memory 67 interposed between the data bus 30 and the input terminal of the decoder 63 of the data input and output port 37B. The data manager 34C has a buffer memory 76 interposed between the data bus 30 and the input terminal of the encoder 72 of the data input and output port 37C. The data manager 34D has a buffer memory 77 interposed between the data bus 30 and the input terminal of the decoder 73 of the data input and output port 37D.

A recording command $C_R$ from an external apparatus can be inputted to a CPU 68 of the data manager 34A and a CPU 78 of the data manager 34C. In response to the recording command $C_R$ from the external apparatus or a recording command from the CPU 53 of the controller 36, the CPU 68 of the data manager 34A and the CPU 78 of the data manager 34C control the processing of transferring and recording data inputted to the terminals 61A and 61C to/in the recorder and reproducer 33. A reproducing command $C_P$ from an external apparatus can be inputted to a CPU 69 of the data manager 34B and a CPU 79 of the data manager 34D. In response to the reproducing command $C_P$ from the external apparatus or a reproducing command from the CPU 53 of the controller 36, the CPU 69 of the data manager 34B and the CPU 79 of the data manager 34D control the processing of allowing the recorder and reproducer 38 to reproduce data and transferring the reproduced data to the terminals 61B and 61D. Here, each of the CPUs 53, 69 and 79 and the CPU 38 is a specific example of a principal part in the reproduction control means of the present invention.

The data managers 34A to 34D allow each of the ports 60A to 60D to make time division access to the recorder and reproducer 33 within a time slot based on a timing pulse supplied from the timing pulse generator 41 of the timing manager 31.

The data input and output ports 37A to 37D and the data managers 34A to 34D can be replaced with other types of data input and output ports and data managers, respectively. For example, an input type of combination of the data input and output port 37C and the data manager 34C can be replaced with an output type of data input and output port and data manager such as a combination of the data input and output port 37B and the data manager 34B. In this case, the data recording/reproducing apparatus is changed to an apparatus having one input port (the port 60A) and three output ports (the ports 60B to 60D).

Each of the CPUs of the circuits shown in FIG. 2 comprises a microcomputer having a ROM and a RAM, although not shown.

The data recording/reproducing apparatus according to the embodiment can record and reproduce edited data composed of a combination of a plurality of partial data extracted from at least one material data and can reedit the edited data such as apply the edited data to so-called trimming. Location information on a location of the partial data in the material data is managed by the information manager 32. In the data recording/reproducing apparatus according to the embodiment, when the start point (IN point) or the end point (OUT point) of the partial data of the edited data to be reedited is specified, the recorder and reproducer 33 and the HDDs 45 and 46 are controlled so as to reproduce the material data containing at least the partial data to be reedited in synchronization with operation for changing the specified start or end point of the partial data. More specifically, in the data recording/reproducing apparatus according to the embodiment, when the start or end point of the partial data to be reedited is specified, at least either the specified start or end point of the partial data of the location information of each partial data contained in the edited data is replaced by the start or end point of the material data. On the basis of the replaced location information, the recorder and reproducer 33 and the HDDs 45 and 46 are controlled so as to reproduce the material data containing at least the partial data to be reedited in synchronization with changing operation. The above-mentioned control is mainly performed by the CPU 53 of the controller 36. Various types of operations incidental to reediting mentioned above can be performed by the external control panel 91.

Furthermore, in the data recording/reproducing apparatus according to the embodiment, when operation for determining a new start or end point is performed in a state in which the material data is reproduced in synchronization with changing operation as described above, the edited data is reedited in accordance with determining operation. In this case, the location information of each partial data of the edited data managed by the information manager 32 is changed in accordance with operation for determining a location to be changed.

In FIG. 2, the recorder and reproducer 33 and the HDDs 45 and 46 correspond to a specific example of "recording/reproducing means" of the invention. The information manager 32 corresponds to a specific example of "managing means" of the invention. The controller 36 corresponds to a specific example of "controlling means" and "editing means" of the invention. In FIG. 2, mainly, the external control panel 91, the controller 36 and the information manager 32 correspond to a specific example of "a data editing apparatus" of the invention.

Next, the file management information managed by the information manager 32 will be described with reference to FIGS. 5A and 5B and FIGS. 6A and 6B.

The file management information mainly comprises a file entry (FE) shown in FIG. 5A and a record entry (RE) shown in FIG. 5B. The file entry and the record entry are linked to each other.

The file entry comprises three items, i.e., a file name, a pointer to be linked to the first record entry having recording area information corresponding to the file name, and a file number. In the embodiment, the external control panel 91 can select a desired file by specifying the file number described in the file entry.

The record entry indicates which area in an address space of the HDDs 45 and 46 records data having the file name indicated by the linked file entry. The record entry comprises three items, i.e., a pointer to the record entry indicating an area in which next data in the same file is recorded, a head address of a head location of the area in which the data is recorded, and a data length (size) of a continuous recording area starting at the head address. When all data contained in one file are recorded in a continuous area in the address space of the HDDs 45 and 46, the record entry comprises a single record entry. When data contained in one file are divided into and recorded in a plurality of areas in the address space of the HDDs 45 and 46, the record entry comprises a list of a plurality of record entries corresponding to a plurality of areas. In this case, a plurality of record entries is linked to pointers in order by the item "a pointer to a next record entry". When a record entry corresponding to a next recording area does not exist, "EOF (End of File)" indicating the end of data contained in one file is described.

Figure 6A:
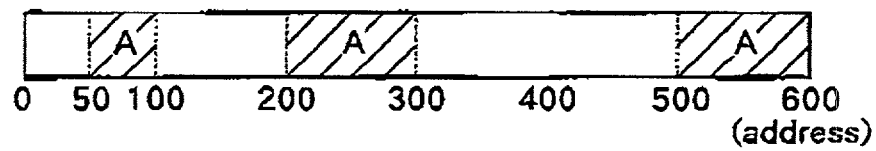
FIGS. 6A and 6B are illustrations of a specific example of the file management information shown in FIGS. 5A and 5B.
Figure 6B:
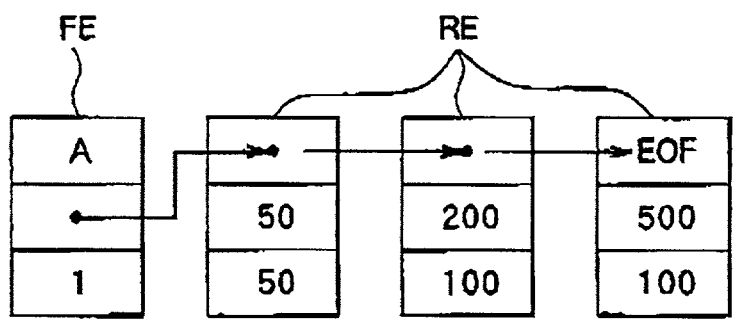

FIGS. 6A and 6B are illustrations of a specific example of the file management information. The description is given with regard to the case in which data having a file name "A" and a file number "1" is divided into and recorded in three areas, i.e., an area from address 50 to address 100, an area from address 200 to address 300 and an area from address 500 to address 600 in the address space of the HDDs 45 and 46, as shown in FIG. 6A.

The file management information about the data of the file name A recorded as mentioned above is represented as shown in FIG. 6B by use of the file entry and the record entry. That is, in the file entry, "A" is described in the item "the file name", and "1" is described in the item "the file number". In the file entry, "the pointer to the first record entry" is linked to the record entry indicating the data recorded in address 50 to 100.

In the record entry indicating the data recorded in address 50 to 100, "50" is described in the item "the head address", and "50" is described in the item "the data length of the continuous area". In the record entry indicating the data recorded in address 50 to 100, "the pointer to the next record entry" is linked to the record entry indicating the data recorded in address 200 to 300. In the record entry indicating the data recorded in address 200 to 300, "200" is described in the item "the head address", and "100" is described in the item "the data length of the continuous area". In the record entry indicating the data recorded in address 200 to 300, "the pointer to the next record entry" is linked to the record entry indicating the data recorded in address 500 to 600. In the record entry indicating the data recorded in address 500 to 600, "500" is described in the item "the head address", and "100" is described in the item "the data length of the continuous area". In the record entry indicating the data recorded in address 500 to 600, "EOF" indicating the end of the data of the file name A is described in "the pointer to the next record entry".

Next, operation of the data recording/reproducing apparatus according to the embodiment will be described. Firstly, operation of the main unit 1 will be described.

First, operation for recording AV data inputted from an external apparatus will be described. In this case, data is inputted to at least one of the terminals 61A and 61C. The data inputted to the terminal 61A is inputted to and compressed by the encoder 62 via the switch 64 in the data input and output port 87A. The compressed data is temporarily stored in the buffer memory 66 in the data manager 34A. The data manager 34A makes access to the recorder and reproducer 33 within the allocated time slot period and transfers the data stored in the buffer memory 66 or 76 to the recorder and reproducer 33 through the data bus 30. The data inputted to the terminal 61C is inputted to and compressed by the encoder 72 via the switch 74 in the data input and output port 37C. The compressed data is temporarily stored in the buffer memory 76 in the data manager 34C. The data manager 34C makes access to the recorder and reproducer 33 within the allocated time slot period and transfers the data stored in the buffer memory 66 or 76 to the recorder and reproducer 33 through the data bus 30.

In the recorder and reproducer 33, the transferred data is temporarily stored in the buffer memory 49 and then the data is read out from the buffer memory 49. Of the data read out from the buffer memory 49, video data is inputted to the video disk array controller 47 and audio data is inputted to the audio disk array controller 48. The video disk array controller 47 divides the input video data into predetermined units, calculates parity data and records the divided data and the parity data on a plurality of HDDs 45. The audio disk array controller 48 records the input audio data on the two HDDs 46.

Next, operation for outputting recorded data to an external apparatus will be described. In this case, at least one of the data managers 34B and 34D makes access to the recorder and reproducer 33 through the control bus 50 within the allocated time slot period and requests the recorder and reproducer 33 to reproduce data. In the recorder and reproducer 33, the video disk array controller 47 reads out the divided video data and the parity data from a plurality of HDDs 45 and combines to unify the divided data, while performing error detection and error correction on the basis of the parity data and reproducing video data. The audio disk array controller 48 reproduces audio data from an error-free HDD 46 of the two HDDs 46. The reproduced video data and audio data are temporarily stored in the buffer memory 49 and then read out from the buffer memory 49. Then, the video and audio data are transferred to the data manager 34B or 34D through the data bus 30.

To output the data from the terminal 61B to an external apparatus, the reproduced data is inputted to and expanded by the decoder 63 in the data input and output port 37B through the buffer memory 67 in the data manager 34B. Then, the expanded data is outputted from the terminal 61B to the external apparatus through the switch 65. To output the data from the terminal 61D to an external apparatus, the reproduced data is inputted to and expanded by the decoder 73 in the data input and output port 37D through the buffer memory 77 in the data manager 34D. Then, the expanded data is outputted from the terminal 61D to the external apparatus through the switch 75.

In the data recording/reproducing apparatus according to the embodiment, the data managers 34A to 34D operate under the time division control. Thus, the same data or different data can be simultaneously inputted from the two terminals 61A and 61C, and the same data or different data can be simultaneously outputted from the two terminals 61B and 61D.

Next, operation for editing data will be described. The editor 51 of the controller 86 edits data by using at least either data inputted from an external apparatus or data reproduced by the recorder and the reproducer 38. That is, input data from the external apparatus through the terminal 61A or 61C and output data reproduced by the recorder and reproducer 33 and expanded by the decoders 63 and 73 are inputted to the editor 51. The editor 51 performs edits by use of at least one of these data by utilizing the matrix switcher and the audio mixer provided in the editor 51 or by utilizing the special effecter 39 as needed. The editor 51 can perform AB roll editing for obtaining special effects such as dissolve or wipes.

The editor 51 can output data obtained through editing to any one of the switches 64, 65, 74 and 75. The data outputted to the switches 64 and 74 are recorded on the HDDs 45 and 46 by the recorder and reproducer 33. The data outputted to the switches 65 and 75 are outputted from the terminals 61B and 61D respectively.

As described above, in the data recording/reproducing apparatus according to the embodiment, the HDDs 45 and 46 having the RAID configuration are used as means for storing data, and the ports 60A to 60D can make time division access to the recorder and reproducer 33. Thus, the recorder and reproducer 33 and the HDDs 45 and 46 can have the functions equivalent to two to four VCRs. Therefore, in the data recording/reproducing apparatus according to the embodiment, a system needed for editing in a relay car or in the open can be established in a small occupied space. Moreover, editing work becomes simple because work incidental to editing such as frequent replacement of videotapes becomes no longer necessary.

Moreover, in the data recording/reproducing apparatus according to the embodiment, the editor 51 can perform edits independently of inputting and outputting of AV data. Thus, AV data can be simultaneously, concurrently recorded, edited and broadcasted. Furthermore, in the data recording/reproducing apparatus according to the embodiment, the data managers 34A to 34D make time division access to the recorder and reproducer 33. Thus, each of the ports 60A to 60D can make access to the recorder and reproducer 33 apparently simultaneously. Consequently, data can be simultaneously inputted to and outputted from each of the ports 60A to 60D.

In the data recording/reproducing apparatus according to the embodiment, a part of the above-described operation of the main unit 1 can be controlled by the external control panel 91.

Next, operation control using the external control panel 91 will be specifically described.

Firstly, the description is given with regard to the case in which the main panel 91A is used to control the main unit 1 for inputting and outputting a file, as an example of operation using the external control panel 91.

In this case, first, which port in the main unit 1 is to be operated is determined by manipulating the port select keys 102. In an example shown in FIG. 4, the port select keys 102 having legends "R1" and "R2" thereon correspond to the input ports 60A and 60C shown in FIG. 2, respectively. The port select keys 102 having legends "P1" and "P2" thereon correspond to the output ports 60B and 60D shown in FIG. 2, respectively. The port select keys 102 comprise a plurality of as many keys as the ports of the main unit 1. Only one of the keys can be selected, and a plurality of keys cannot be selected at a time. Therefore, only the port corresponding to the manipulated key of the port select keys 102 is selected as the port which a file is to be inputted to and outputted from. The indicator 106 provided on the surface of the port select key 102 corresponding to the selected port illuminates and thus indicates a status in which the port is selected.

Then, a file to be inputted and outputted is selected by manipulating the up key 103 and the down key 104 for specifying a file. As already described with reference to FIGS. 5A and 5B and FIGS. 6A and 6B, in the data recording/reproducing apparatus according to the embodiment, the file is managed by the file management information containing the file entry and the record entry. The file entry contains information such as the file name and the file number. Therefore, data can be specified in order of file number in accordance with whether the file number contained in the file management information is high or low by manipulating the up key 103 and the down key 104.

Figure 7:
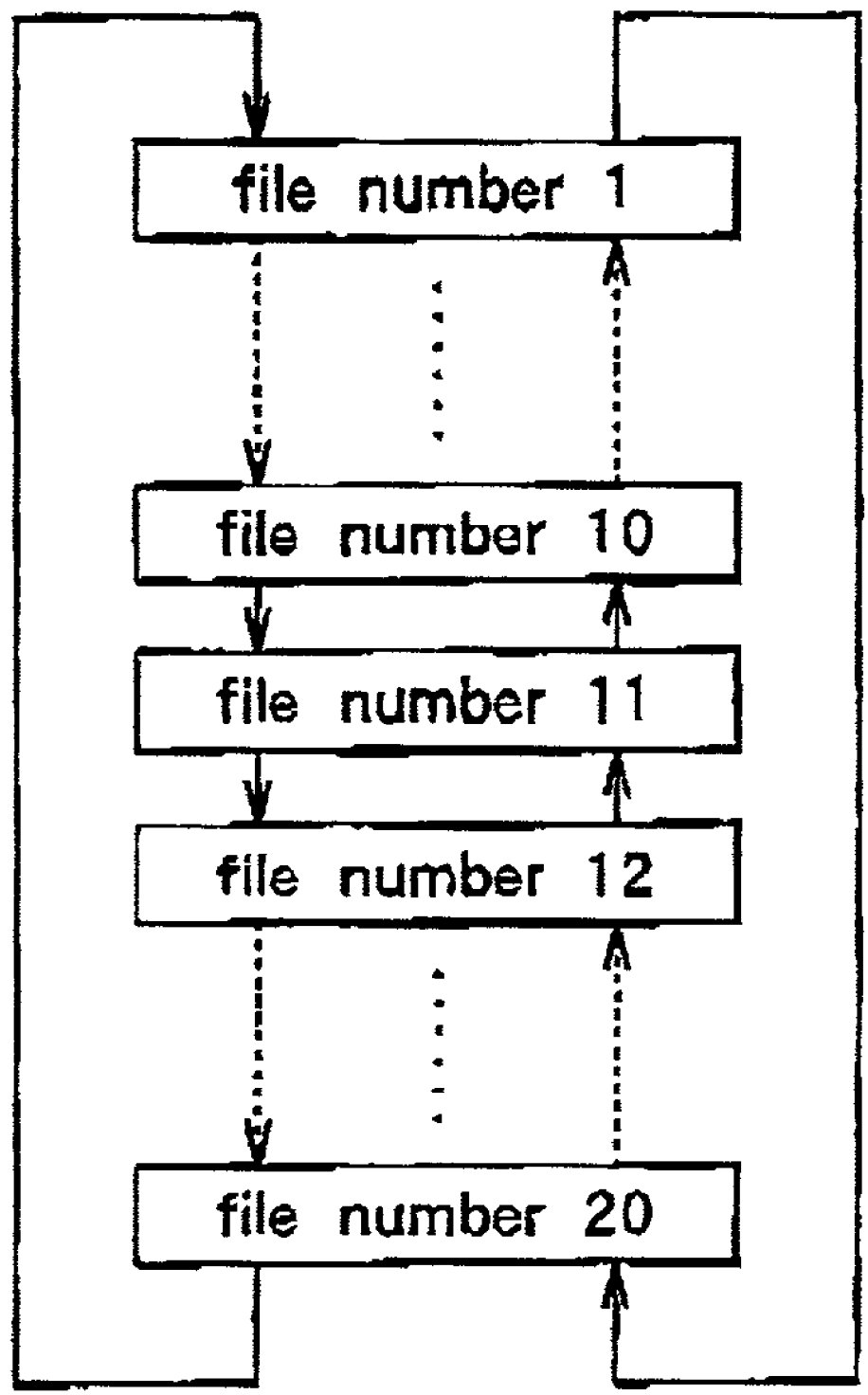
FIG. 7 is an illustration of operation for specifying a file number using an up key and a down key on the external control panel shown in FIG. 4.

FIG. 7 is an illustration of operation for specifying the file number using the up key 103 and the down key 104. For example, it is assumed that a file having a file number 10 is now open to record or reproduce the file. When the up key 103 is pressed in this state, the CPU 92 of the external control panel 91 issues control commands indicating that the up key 103 is pressed to the CPU 58 of the controller 36 of the main unit 1. In the main unit 1, the current file with the file number 10 being recorded or reproduced in the selected port is closed. Then, if a file having a file number 11 exists, the file is opened (reproduced). If the file having the file number 11 does not exist, the existing file is opened in order of increasing file number. For example, when the file having the file number 11 does not exist and a file having a file number 12 exists, the file having the file number 12 is opened. When the up key 103 is pressed in a state in which a file having the highest file number is selected, a file having the lowest file number is then opened. In an example shown in FIG. 7, the highest file number is 20. Thus, when the up key 103 is pressed in a state in which the file number 20 is selected, a file to be opened is a file having a file number 1. Operation using the down key 104 is basically the same as the above-described operation using the up key 108 only except that the file number is selected in reverse order, namely, in order of decreasing file number.

The information such as the file number and the file name of the file selected by manipulating the port select keys 102, the up key 103 and the down key 104 as described above is outputted as the data $D_M$ for a monitor (not shown) from the editor 51 of the controller 36. For example, a screen of the monitor displays the information about the file superimposed on a picture of a current open file so that a user can view the information about the selected file.

Next, a feature of the embodiment, i.e., reediting of edited data using the external control panel 91 will be specifically described. Reediting of data herein described refers to reediting using the trim facilities. The trim facility is a function to finely adjust the edited data as described in the Related Art. The following description also includes the description of a data editing method according to the embodiment.

FIGS. 8A to 8D are illustrations of a specific example of a structure of edited data to be reedited. As shown in FIGS. 8A to 8C, material data A, B and C exist on the HDDs 45 and 46. The material data A, B and C are edited into an edited file D as edited data shown in FIG. 8D by using the external control panel 91 or the like. Since the material data A, B and C are managed as separate "files", the material data A, B and C are hereinafter sometimes called files A, B and C.

The data recording/reproducing apparatus according to the embodiment edits data not by actually editing data itself but by editing the file management information. It is the file management information managed by the information manager 32 which is finally changed by editing data. However, it is the file management information stored in the RAM 54 of the controller 36 which is used halfway through editing. As described above, data management by means of the file management information managed by the information manager 32 is performed by corresponding data to the address space of the HDDs 45 and 46. On the other hand, the file management information stored in the RAM 54 of the controller 36 is the time code value into which an address value on the HDDs 45 and 46 is converted. Accordingly, the data structure will be hereinafter described by referring to the time code value, not the address value on the HDDs 45 and 46.

As shown in FIG. 8A, the material data A is video data having a length of 30 minutes from the start point 00:00 to the end point 30:00 in terms of time code value. As shown in FIG. 8B, the material data B is video data having a length of 20 minutes from the start point 00:00 to the end point 20:00 in terms of time code value. As shown in FIG. 8C, the material data C is video data having a length of 28 minutes from the start point 00:00 to the end point 28:00 in terms of time code value.

As shown in FIG. 8D, the edited file D has a two-channel data structure comprising a video channel and an audio channel. Data of the video channel has a structure in which partial data extracted from the material data A and partial data extracted from the material data B are combined with each other in this order. The structure of the partial data of the material data A has a data length of 10 minutes from the IN point (start point) 15:00 to the OUT point (end point) 25:00. The structure of the partial data of the material data B has a data length of 10 minutes from the IN point 05:00 to the OUT point 15:00. Therefore, the total data length of the partial data of the material data A and the partial data of the material data B is equal to 20 minutes. On the other hand, data of the audio channel has a structure comprising only partial data extracted from the material data C. The structure of the partial data of the material data C has a data length of 20 minutes from the IN point 03:00 to the OUT point 23:00.

Firstly, the description is given with reference to FIGS. 9A to 9C with regard to the case in which the edited file D having the structure shown in FIG. 8D is reedited by trimming backward the OUT point of the partial data of the material data A in the video channel. In an example shown in FIGS. 9A to 9C, the OUT point 25:00 of the partial data of the material data A is changed to a 2-minute-later point 27:00, whereby the edited file D is reedited so as to increase the data length of the partial data of the material data A to 12 minutes.

When the OUT point of the partial data of the material data A is trimmed backward, two types of edit results are assumed. A first edit result is a reedited file D2 shown in FIG. 9B, which is created by moving (extending) backward the OUT point of the partial data with the total length of the edited file D fixed. In this case, the partial data of the file B is overwritten with the partial data of the file A by the length of an extension of the partial data of the file A (hereinafter, this editing is called overwrite mode). When reediting takes place in the overwrite mode, the IN point of the partial data of the file B is changed to 07:00, and consequently the data length thereof is reduced to 8 minutes. Reediting in the overwrite mode causes no change in the data of the audio channel. Here, the overwrite mode corresponds to a specific example of "first mode" of the present invention.

A second edit result is a reedited file D3 shown in FIG. 9C, which is created by moving (extending) backward the OUT point of the partial data of the file A while keeping the partial data of the file B as it is. In this case, the total length of the edited file D increases by the length of the extension of the partial data of the file A (hereinafter, this editing is called insert mode). Reediting in the insert mode causes no change in the partial data of the file B. In reediting in the insert mode, a mute section composed of mute (non-audio or non-video) data $\mu$ having a length equivalent to an increase of the total length is added to the audio channel. In an example shown in FIG. 9C, the mute data $\mu$ has the IN point 00:00 and the OUT point 02:00 and has a data length of 2 minutes. Here, the insert mode corresponds to a specific example of "second mode" of the present invention.

Either the overwrite mode or the insert mode is selected. The overwrite mode or the insert mode can be selected by the insert mode key 115 on the external control panel 91. The indicator 106 provided on the surface of the insert mode key 115 changes in illuminating status every time the key 115 is pressed. When the indicator 106 of the insert mode key 115 illuminates, the indicator 106 indicates the insert mode. When the indicator 106 does not illuminate, the indicator 106 indicates the overwrite mode. To perform trimming by means of the external control panel 91, the mode is specified first. When the insert mode key 115 is pressed, the CPU 92 of the external control panel 91 transmits to the controller 36 of the main unit 1 control commands indicating that the insert mode key 115 is pressed. Upon the receipt of the control commands from the external control panel 91, the controller 36 changes an internal operation mode table in accordance with the control commands.

After the overwrite mode or the insert mode is selected, operation for finding the IN point or the OUT point to be trimmed is then performed. Although the jog dial 121 or the like on the subpanel 91B can be used to find the IN point or the OUT point, the go-head key 112 and the go-tail key 113 are practically used. When any of the jog dial 121, the go-head key 112 or the go-tail key 113 is pressed, the CPU 92 as a controller transmits a control command (first control signal) to move the reproduction target position to the position corresponding to the operation. For example, the IN point of the file A is found at the press of the go-head key 112 between the IN point and the OUT point of the file A in the edited file D (see FIG. 8D). The IN point of the file B is found at the further press of the go-head key 112. In this manner, the files are searched in sequence for the IN point. The OUT point of the file A is found at the press of the go-tail key 113 between the IN point and the OUT point of the file A. The OUT point of the file B is found at the further press of the go-tail key 113. In this manner, the files are searched in sequence for the OUT point. Therefore, for editing shown in FIGS. 9A to 9C, for example, if the partial data of the current file A is reproduced, the OUT point of the file A can be found at the press of the go-tail key 113.

Next, the apparatus enters actual trimming operation. Transition to trim mode is made by pressing the trim key 114 on the main panel 91A. When the trim key 114 is pressed, the indicator 106 provided on the surface of the trim key 114 illuminates and thus informs a user of the entry into the trim mode. When the trim key 114 is pressed, the CPU 92 of the external control panel 91 transmits to the controller 36 of the main unit 1 control commands indicating that the trim key 114 is pressed. Upon the receipt of the control commands from the external control panel 91, the controller 36 refers to the internal table stored in the RAM 54 to see material data composing the current edited file D, and then the controller 36 creates a temporary file D1 shown in FIG. 9A.

To perform reediting for trimming backward the OUT point of the partial data of the material data A, created is the temporary file D1 shown in FIG. 9A in which the OUT point (25:00) of the partial data of the material data A is replaced by the OUT point (30:00) of the material data A before editing. The partial data of the audio channel is also changed and created in accordance with the replacement of the OUT point of the partial data of the material data A. In an example shown in FIG. 9A, the OUT point (23:00) of the partial data of the audio channel is changed to 18:00 in accordance with the replacement of the OUT point of the partial data of the material data A. In this editing, the temporary file D1 does not contain the partial data of the material data B because the partial data of the material data B is located at the back of the partial data of the material data A.

In the embodiment, trimming is performed on the basis of the temporary file. Thus, the contents of data in the temporary file are reproduced in synchronization with operation for changing the IN point or the OUT point of partial data specified as data to be trimmed. In the example shown in FIG. 9A, reproducing of the temporary file D1 in the first step after the transition to the trim mode starts at the original OUT point (25:00) of the partial data of the material data A. Since the time required to create the temporary file is instantaneous, a user views a reproduced picture as if the same picture as the picture reproduced at the time of the press of the trim key 114 were again outputted after an instantaneous output of a black picture (substantially, no picture).

The temporary file is a reproducible file similarly to typical data. Thus, in a state in which data in the temporary file is reproduced, a user can freely change a location of data in the temporary file to be reproduced by using the jog dial 121 or the like. In the example shown in FIGS. 9A to 9C, trimming is performed so as to extend backward the partial data of the file A. In this case, an operating method is as follows. The user changes the location of data to be reproduced to the point 27:00 of the file A by using the jog dial 121 or the like, while viewing a picture of the temporary file D1 actually outputted to the monitor. Then, the user again presses the trim key 114 to determine the point 27:00 (determining operation). When the trim key 114 is again pressed in the trim mode, the CPU 92 of the external control panel 91 transmits to the controller 36 of the main unit 1 control commands indicating that the trim key 114 is again pressed. Upon the receipt of the control commands to exit the trim mode from the external control panel 91, the controller 36 detects the location determined by again pressing the trim key 114. Then, the controller 36 transmits to the information manager 32 control commands to change the edited file D as shown in FIG. 9B or 9C according to whether the current mode is the overwrite mode or the insert mode. The information manager 32 reedits the file management information in accordance with the contents of the commands from the controller 36.

Next, the description is given with reference to FIGS. 10A to 10C with regard to the case in which the edited file D having the structure shown in FIG. 8D is reedited by trimming forward the IN point of the partial data of the material data B in the video channel. In an example shown in FIGS. 10A to 10C, the IN point 05:00 of the partial data of the material data B is changed to a 3-minute-earlier point 02:00, whereby the edited file D is reedited so as to increase the data length of the partial data of the material data B to 13 minutes.

In this case, two types of edit results are assumed similarly to the example shown in FIGS. 9A to 9C. A first edit result is a reedited file D12 shown in FIG. 10B, which is created by moving (extending) forward the IN point of the partial data with the total length of the edited file D fixed. In this case, the partial data of the file A is overwritten with the partial data of the file B by the length of an extension of the partial data of the file B. When reediting takes place in the overwrite mode, the OUT point of the partial data of the file A is changed to 22:00, and consequently the data length thereof is reduced to 7 minutes. Reediting in the overwrite mode causes no change in the data of the audio channel.

A second edit result is a reedited file D13 shown in FIG. 10C, which is created by moving (extending) forward the IN point of the partial data of the file B while keeping the partial data of the file A as it is. In this case, the total length of the edited file D increases by the length of the extension of the partial data of the file B. Reediting in the insert mode causes no change in the partial data of the file A. In reediting in the insert mode, a mute section composed of mute data $\mu$ having a length equivalent to an increase of the total length is added to the front of the audio channel. In an example shown in FIG. 10C, the mute data $\mu$ has the IN point 00:00 and the OUT point 03:00 and has a data length of 3 minutes.

In a temporary file D11 created in this case, as shown in FIG. 10A, the IN point (05:00) of the partial data of the material data B is replaced by the IN point (00:00) of the material data B before editing. The partial data of the audio channel is also changed and created in accordance with the replacement of the IN point of the partial data of the material data B. In an example shown in FIG. 10A, the IN point (03:00) of the partial data of the audio channel is changed to 08:00 in accordance with the replacement of the IN point of the partial data of the material data B. In this editing, the temporary file D11 does not contain the partial data of the material data A because the partial data of the material data A is located in front of the partial data of the material data B.

An approach for performing trimming operation based on the temporary file in the example shown in FIGS. 10A to 10C is the same as the approach shown in FIGS. 9A to 9C.

Next, the description is given with reference to FIGS. 11A and 11B with regard to the case in which the edited file D having the structure shown in FIG. 8D is reedited by trimming backward the OUT point of the partial data of the material data B in the video channel. In an example shown in FIGS. 11A and 11B, the OUT point 15:00 of the partial data of the material data B is changed to a 2-minute-later point 17:00, whereby the edited file D is reedited so as to increase the data length of the partial data of the material data B to 12 minutes.

In this case, an edit result is a reedited file D22 shown in FIG. 11B, which is created by moving (extending) backward the OUT point of the partial data of the file B while keeping the partial data of the file A as it is. In this case, the total length of the edited file D increases by the length of an extension of the partial data of the file B. In this case, a mute section composed of mute data $\mu$ having a length equivalent to an increase of the total length is added to the back of the audio channel. In an example shown in FIG. 11B, the mute data $\mu$ has the IN point 00:00 and the OUT point 02:00 and has a data length of 2 minutes.

In a temporary file D21 created in this case, as shown in FIG. 11A, the OUT point (15:00) of the partial data of the material data B is replaced by the OUT point (20:00) of the material data B before editing. The partial data of the audio channel is also changed and created in accordance with the replacement of the OUT point of the partial data of the material data B. In an example shown in FIG. 11A, the mute section composed of the mute data $\mu$ having a data length of 5 minutes is added to the back of the audio channel in accordance with the replacement of the OUT point of the partial data of the material data B. In this editing, the partial data of the material data A is not changed in the temporary file D21 because the partial data of the material data A is located in front of the partial data of the material data B.

An approach for performing trimming operation based on the temporary file in the example shown in FIGS. 11A and 11B is the same as the approach shown in FIGS. 9A to 9C.

Although the description has been given above with regard to an example of the case in which trimming is performed so as to extend partial data, trimming can be also performed so as to reduce data backward, for example. In this case, two patterns of edit results are assumed similarly to the case in which partial data is extended. A first edit result is a pattern in which the total length of the edited file D decreases by the length of a reduction of the partial data (hereinafter, this editing is called ripple on mode). A second edit result is a pattern in which a section having a length equivalent to the reduction of the partial data is composed of mute data $\mu$ and the total length of the edited file D does not change (hereinafter, this editing is called ripple-off mode). The ripple-on mode or the ripple-off mode can be selected by the ripple mode key 116 on the external control panel 91. The indicator 106 provided on the surface of the ripple mode key 116 changes in illuminating status every time the key 116 is pressed. When the indicator 106 of the ripple mode key 116 illuminates, the indicator 106 indicates the ripple-on mode. When the indicator 106 does not illuminate, the indicator 106 indicates the ripple-off mode. When the ripple mode key 116 is pressed, the CPU 92 of the external control panel 91 transmits to the controller 36 of the main unit 1 control commands indicating that the ripple mode key 116 is pressed. Upon the receipt of the control commands from the external control panel 91, the controller 36 changes the internal operation mode table in accordance with the control commands. The temporary file created for trimming for reducing the partial data as described above and other operations are the same as those for trimming for extending the partial data. Here, the ripple-off mode corresponds to a specific example of "first mode" of the present invention and the ripple-on mode corresponds to a specific example of "second mode" of the present invention.

The description has been given above with regard to the case in which partial data to be trimmed is restored to a state of the original material data in either the forward or backward direction in accordance with specification of the IN point and the OUT point, whereby the temporary file is created. However, partial data may be restored to a state of the original material data in both of the forward and backward directions, whereby the temporary file is created.

The description has been given above with regard to the case in which data of the video channel is subjected to trimming. Data of the audio channel is subjected to trimming in the same manner as trimming of data of the video channel. The description has been given above with regard to the case in which the number of channels is two. When the number of channels is one or three or more, trimming can be, however, performed in the same manner as the above-described method.

Next, operation for controlling the main unit 1 to realize the above-described reediting of edited data will be described with reference to a flow chart shown in FIG. 12.

Figure 12:
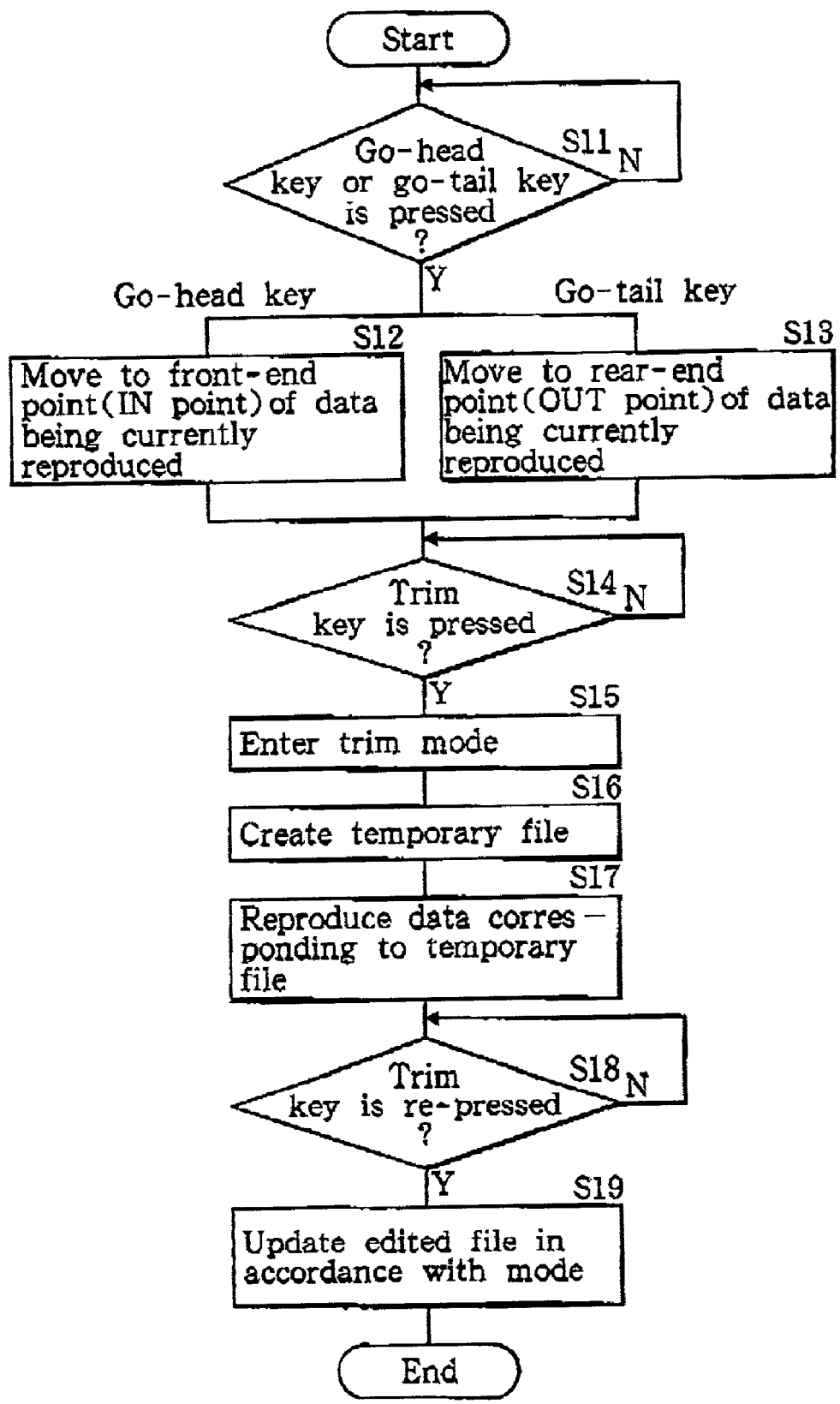
FIG. 12 is a flow control of controlling operation about the trim facilities by a main unit of the data recording/reproducing apparatus shown in FIG. 3.

FIG. 12 is a flow chart of controlling operation by means of the CPU 53 of the controller 36. The CPU 53 monitors control commands from the CPU 92 of the external control panel 91 and judges whether or not the go-head key 112 or the go-tail key 118 on the external control panel 91 is pressed (step S11). When the go-head key 112 is pressed, the CPU 53 controls the data manager 34 and the recorder and reproducer 33 of a port that is to perform editing, so as to move the location to be reproduced to the IN point of partial data being currently reproduced (Y in step S11, step S12). On the other hand, when the go-tail key 113 is pressed, the CPU 53 controls the data manager 34 and the recorder and reproducer 33 of a port that is to perform editing, so as to move the location to be reproduced to the OUT point of partial data being currently reproduced (Y is step S11, step S13). For the sake of simplicity of the description, the description is herein given with regard to only operation using the go-head key 112 and to go-tail key 113. However, the IN point and the OUT point may be specified by using the jog dial 121 or the like, for example.

Then, the CPU 53 monitors control commands from the CPU 92 of the external control panel 91 and judges whether or not the trim key 114 on the external control panel 91 is pressed (step S14). When the CPU 53 judges that the trim key 114 is pressed (Y in step S14), the CPU 58 enters the trim mode (step S15). Then, the CPU 53 refers to the internal table stored in the RAM 54 to see which material data the current edited file is composed of, and the CPU 58 creates a temporary file (step S16). The CPU 53 controls the data manager 34 and the recorder and reproducer 33 of a port that is to perform editing, so as to reproduce data corresponding to the created temporary file (step S17).

Then, the CPU 53 monitors control commands from the CPU 92 of the external control panel 91 and judges whether or not the trim key 114 on the external control panel 91 is again pressed (step S18). When the CPU 53 judges that the trim key 114 is re-pressed (Y is step S18), the CPU 53 transmits to the information manager 32 control commands to change the edited file and thereby create a reedited file in accordance with the mode of the trim facilities on the basis of the data location determined by again pressing the trim key 114, thereby causing the information manager 32 to update the edited file (step S19).

As described above, according to the data recording/reproducing apparatus according to the embodiment, when the start point (IN point) or the end point (OUT point) of partial data of edited data to be reedited is specified the recorder and reproducer 33 and the HDDs 45 and 46 are controlled so as to reproduce material data containing at least the partial data to be reedited in synchronization with operation for changing the specified start or end point of the partial data. Furthermore, when operation for determining a new start or end point is performed in a state in which the material data is reproduced in synchronization with changing operation, the edited data is reedited in accordance with determining operation. Therefore, the edited data recorded on a nonlinear-accessible recording medium can be easily reedited. Moreover, according to the embodiment, during the trim mode, a temporary file is created, and data is reedited on the basis of the temporary file. Therefore, the data recording/reproducing apparatus according to the embodiment can reedit data while reproducing the same reproducing state as the reproducing state after reediting.

Moreover, according to the embodiment, data can be reedited by using the external control panel 91 which can be operated with the same ease of operation as the ease of operation of specific keyboard type editing equipment for conventional VCR. Therefore, the data recording/reproducing apparatus according to the embodiment can improve ease of operation for reediting data while making use of merits of a nonlinear-accessible recording medium, as compared to a conventional system in which an application based on a GUI environment is controlled by a pointing device such as a mouse. Furthermore, according to the external control panel 91 according to the embodiment, a port that is to perform reediting can be optionally selected by means of the port select keys 102. Therefore, not only a specific port but also all the ports of the main unit 1 can be controlled by means of the external control panel 91.

The invention is not limited to the above-described embodiment and various modifications of the invention are possible. For example, any switch other than the pushbutton type keys may be used as the operation switches on the external control panel 91. For example, other types of switches such as a turn switch or a toggle switch may be used as the port select keys 102 as long as the switch can select only one port and can be directly manually manipulated by a user.

Moreover, an external editing apparatus, in addition to the external control panel 91, may be connected to the data recording/reproducing apparatus. When the external editing apparatus is connected to the data recording/reproducing apparatus, the external editing apparatus gives the recording command $C_R$, the reproducing command $C_P$ and the edit command $C_E$ to the data recording/reproducing apparatus. In this case, the data recording/reproducing apparatus can perform edits by operating the external editing apparatus together with the external control panel 91.

As described above, according to a data editing apparatus, a data editing method or a data recording/reproducing apparatus of the invention, when the start point or the end point of the partial data of the edited data to be reedited is specified, the material data containing at least the partial data to be reedited is reproduced in synchronization with the operation for changing the specified start or end point of the partial data. Moreover, when the operation for determining a new start or end point is performed in a state in which the material data is reproduced in synchronization with the changing operation, the edited data is reedited in accordance with the determining operation. An effect of being able to easily reedit edited data recorded on a nonlinear-accessible recording medium is therefore achieved.

More particularly, according to the data editing apparatus, the edited data can be reedited by using a console having a specifying switch for specifying the start point or the end point of the partial data to be reedited and a changing operation console capable of performing operation for changing the specified start or end point of the partial data. An effect of being able to move easily reedit edited data is therefore achieved.

Obviously many modifications and variations of the present invention are possible in the light of the above teachings. It is therefore to be understood that within the scope of the appended claims the invention may be practiced otherwise than as specifically described.

What is claimed is:

1. A data editing apparatus for reediting edited data composed of a combination of a plurality of partial data extracted from at least one material data, which is used in combination with a data recording/reproducing apparatus capable of recording/reproducing the material data and edited data by using a nonlinear-accessible recording medium, the data editing apparatus comprising:
   providing means for providing the edited data for reediting;
   controlling means for controlling the data recording/reproducing apparatus so as to reproduce material data containing at least the partial data to be reedited in synchronization with an operation for changing a specified start or end point of the partial data, when the start point or the end point of the partial data of the edited data to be reedited is specified;
   editing means for reediting the edited data in accordance with a determining operation, for determining a new start or end point, the determining operation being performed while the material data is being reproduced in synchronization with the operation for changing the specified start or the end point of the partial data; and
   an external control panel having manually operable elements for controlling said editing means for reediting in the absence of a graphical user interface.

2. A data editing apparatus according to claim 1 further comprising managing means for managing location information which represents location of the partial data in the material data,
   wherein, when the start point or the end point of the partial data to be reedited is specified, the controlling means replaces the location information regarding to at least either the specified start or end point of the partial data by the start or end point of the material data, and controls the data recording/reproducing apparatus so as to reproduce the material data containing at least the partial data to be reedited in synchronization with operation for changing on the basis of the location information replaced, and
   the editing means controls the managing means so as to change the location information managed by the managing means in accordance with the determining operation.

3. A data editing apparatus according to claim 1 further comprising a console having:
   a specifying member for specifying the start point or the end point of the partial data to be reedited, and
   a changing operation member capable of performing operation for changing the specified start or end point of the partial data.

4. A data editing apparatus according to claim 1, wherein the editing means can operate in a plurality of edit modes, and the console further has an edit mode select switch for selecting the edit mode.

5. A data editing apparatus according to claim 1, wherein the material data contains at least either video data or audio data.

6. A data editing method for reediting edited data composed of a combination of a plurality of partial data extracted from at least one material data, which is used in combination with a data recording/reproducing apparatus capable of recording/reproducing the material data and edited data by using a nonlinear-accessible recording medium, the method comprising the steps of:

providing the edited data for reediting;

providing an external control panel having manually operable elements for controlling said editing means for reediting in the absence of a graphical user interface;

controlling the data recording/reproducing apparatus so as to reproduce material data containing at least the partial data to be reedited in synchronization with an operation for changing a specified start or end point of the partial data, when the start point or the end point of the partial data of the edited data to be reedited is specified; and reediting the edited data in accordance with a determining operation, for determining a new start or end point, the determining operation being performed while the material data is being reproduced in synchronization with operation for changing the specified start or the end point of the partial data.

7. A data recording/reproducing apparatus capable of reediting edited data composed of a combination of a plurality of partial data extracted from at least one material data, comprising:

providing means for providing the edited data for reediting;

recording/reproducing means for recording/reproducing the material data and the edited data by using a nonlinear-accessible recording medium;

controlling means for controlling the recording/reproducing means so as to reproduce material data containing at least a part of the plurality of partial data to be reedited in synchronization with an operation for changing a specified start or end point of the partial data, when the start point or the end point of the partial data of the edited data to be reedited is specified;

editing means for reediting the edited data in accordance with a determining operation, for determining a new start or end point, the determining operation being performed while the material data is being reproduced in synchronization with operation for changing the specified start or the end point of the partial data; and an external control panel having manually operable elements for controlling said editing means for reediting in the absence of a graphical user interface.

8. The apparatus of claim 1, wherein the external device is a stand-alone control panel incorporating at least part of the apparatus' functions therein.

9. The apparatus of claim 8, wherein the external device is a stand-alone control panel incorporating at least part of the apparatus' functions therein; wherein the functions comprise reediting, recording/reproducing the material data and the edited data by using a nonlinear-accessible recording medium, and changing the specified start or the end point of the partial data.

10. The method of claim 6, wherein the external device is a stand-alone control panel incorporating at least part of the apparatus' functions therein.

11. The method of claim 10, wherein the functions comprise reediting, recording/reproducing the material data and the edited data by using a nonlinear-accessible recording medium; and changing the specified start or the end point of the partial data.

12. The apparatus of claim 7, wherein the external device is a stand-alone control panel incorporating at least part of the apparatus' functions therein.

13. The apparatus of claim 12 wherein the functions comprise reediting, recording/reproducing the material data and the edited data by using a nonlinear-accessible recording medium, and changing the specified start or the end point of the partial data.

* * * * *